March 26, 1929.  H. C. LORD  1,707,213

JOINT

Filed Aug. 15, 1925

Inventor

Patented Mar. 26, 1929.

1,707,213

UNITED STATES PATENT OFFICE.

HUGH C. LORD, OF ERIE, PENNSYLVANIA.

JOINT.

Application filed August 15, 1925. Serial No. 50,498.

This invention relates to oscillating joints having outer and inner joint members connected by rubber bridging the space between the members and secured to the members by surface bonding. Heretofore joints of this type have been made in which the inner member is in the form of a sleeve through which a bolt or supporting member has been passed, the inner member being locked against turning by keyways or end clamping on the sleeve. In accordance with the present invention the inner member projects integrally beyond the outer member and is supported by direct engagement with the outer surfaces of the inner member. In this way an ordinary solid pin may be used for the inner member and a simple efficient engaging means may be used for supporting it. Features and details of the invention will appear from the specification and claims.

The invention is illustrated in the accompanying drawings as follows:—

Figure 1:
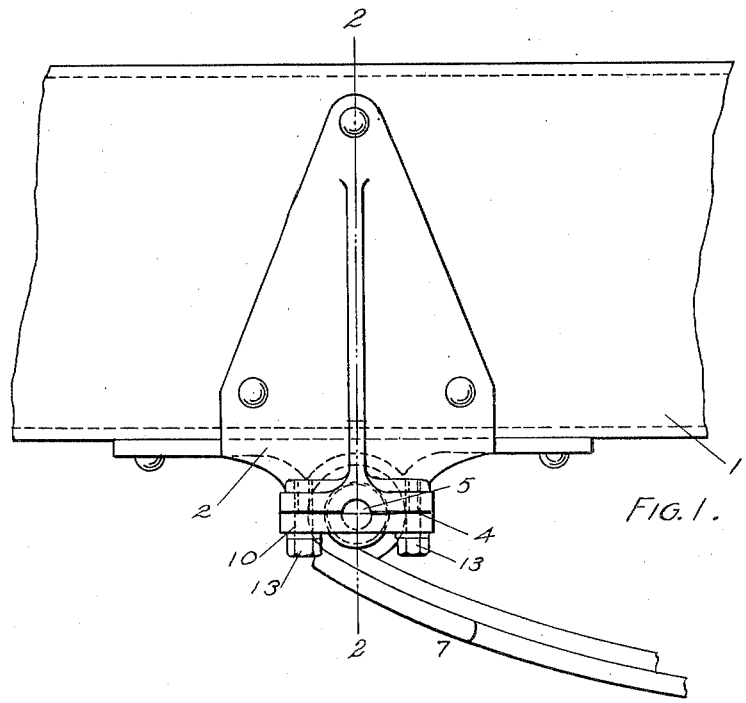

Fig. 1 shows an end elevation of the joint as applied to an automobile spring bracket.

Figure 2:
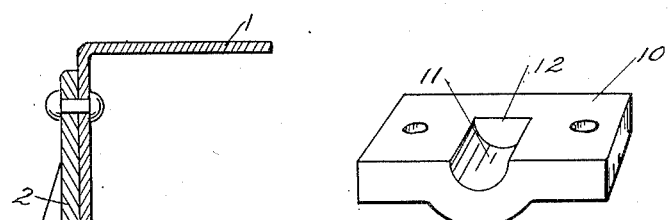

Fig. 2 a section on the line 2—2 in Fig. 1.

Figure 3:
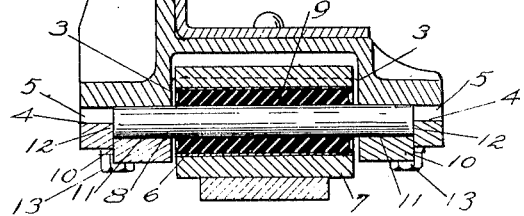

Fig. 3 a view of one of the clamping plates.

1 marks a channel of an automobile frame, and 2 a bracket secured to the channel, this bracket having side walls 3 terminating in faces 4 having grooves 5 extending entirely across the faces 4. By so extending the grooves these grooves may be readily formed or machined. The joint comprises the outer shell 6, which ordinarily is clamped within the spring eye 7, the center pin 8 which is preferably a solid pin, and an intervening rubber joint member 9 which is secured to the outer shell and pin by surface bonding. The ends of the pin 8 project beyond the ends of the shell 6 and rest in the grooves 5. A clamping plate 10 has grooves 11 for engaging the outer surface of the pin and the ends of the grooves at 12 are closed engaging the ends of the pins. The plates 10 are clamped to the bracket faces by cap screws 13, thus securely clamping the pins by engagement with their outer surfaces and the ends 12 engage the ends of the pins thus affording additional security against endwise movement. This is important as the rubber joint is designed to take the thrust radially, torsionally and axially and preferably to prevent any metal to metal contact. In forming the clamping plates I prefer to make a stamping, bending the metal to form the groove 11, and cutting the part so bent from the part 12 as it is bent, thus forming the shoulder.

The extended ends of the inner joint member not only make a superior means of securing this member but also add to the convenience in manufacture in that the joint surfaces in order to adapt them for bonding in vulcanization are necessarily processed and the ends add to the convenience of handling in this respect and these ends also form a means of guiding or centering the member during the vulcanizing process without requiring added machine work as in the method shown in my prior Patent #1,548,049.

What I claim as new is:—

1. In a joint, the combination of an outer joint member; an inner joint member projecting integrally beyond the ends of the outer joint member; a rubber member bridging the space between the joint members secured through a surface union with the joint members and sustaining the radial and torsional thrusts on the joint; and means engaging the outer surfaces and ends of the projecting ends of the inner joint member for supporting and locking said member in place comprising clamping walls with grooves extending entirely through said walls for receiving the inner joint member, and clamping plates, each having a groove terminating at a shoulder for clamping said inner joint member with the shoulders engaging the ends of the member.

2. In a joint, the combination of an outer joint member; an inner joint member projecting integrally beyond the ends of the outer joint member; a rubber member bridging the space between the joint members secured through a surface union with the joint members and sustaining the radial and torsional thrusts on the joint; and means engaging the outer surfaces and ends of the projecting ends of the inner joint member for supporting and locking said member in place comprising clamping plates, each having a struck up groove in the plate for receiving the member the material struck up for the groove being separated from the plate at the inner end of said groove to form a shoulder engaging an end of the inner joint member.

3. In a joint, the combination of an outer joint member having an opening therein and an inner joint member within the opening; rubber bridging the space between and engaging with the inner and outer joint members and locking the rubber with relation to the members to sustain through the rubber the normal torsional, radial and axial thrusts on the joint; and an attaching end extending integrally from the inner joint member and disposed and adapted for connection to a rigid support by direct and fixed engagement of the end with the support.

4. In a joint, the combination of an outer joint member having an opening therein and an inner joint member within the opening; rubber bridging the space between and engaging with the inner and outer joint members and locking the rubber with relation to the members to sustain through the rubber the normal thrusts on the joint; and attaching ends extending equally from each end of the inner joint member and disposed and adapted for connection to a rigid support by direct and fixed engagement of the end with the support.

5. In a joint, the combination of an outer joint member having an opening therein and an inner joint member within the opening; a rubber member bridging the space between and connected by a surface bonding of the rubber to the inner and outer joint members and sustaining through its connection with the inner and outer joint members the torsional, radial and axial thrusts on the joint; and an attaching end extending integrally from the inner joint member and disposed and adapted for connection to a rigid support by direct and fixed engagement of the end with the support.

6. In a joint, the combination of an outer joint member having an opening therein and an inner joint member within the opening; rubber bridging the space between and engaging with the inner and outer joint members and locking the rubber with relation to the members to sustain through the rubber the normal thrusts on the joint; an attaching end extending integrally from the inner joint member adapted for connection to a rigid supporting means; and means supporting the joint through fixed engagement with the outer surfaces of the attaching end.

7. A joint element comprising an outer cylindrical shell adapted to be inserted in a joint opening; an inner joint member within the shell; rubber bridging the space between and engaging with the inner and outer joint members and locking the rubber with relation to the members to sustain through the rubber the normal inner and outer joint members the torsional, radial and axial thrusts on the joint; and an attaching end extending integrally from the inner joint member and disposed and adapted for connection to a rigid support by direct and fixed engagement of the end with the support.

8. In a joint, the combination of an outer joint member having an opening therein and an inner joint member within the opening; rubber bridging the space between and engaging with the inner and outer joint members and locking the rubber with relation to the members to sustain through the rubber the normal thrusts on the joint; and an attaching end extending integrally from the inner joint member and disposed and adapted for connection to a rigid support by direct and fixed engagement of the end with the support.

9. In a joint, the combination of an outer member having an opening therein and an inner joint member within the opening; a rubber member bridging the space between and connected by a surface bonding of the rubber to the inner and outer joint members and sustaining through its connection with the inner and outer joint members the thrusts on the joint; and an attaching end extending integrally from the inner joint member and disposed and adapted for connection to a rigid support by direct and fixed engagement of the end with the support.

10. A joint element comprising an outer cylindrical shell adapted to be inserted in a joint opening; an inner joint member within the shell; rubber bridging the space between and engaging with the inner and outer joint members and locking the rubber with relation to the members to sustain through the rubber the normal thrusts on the joint; and an attaching end extending integrally from the inner joint member and disposed and adapted for connection to a rigid support by direct and fixed engagement of the end with the support.

In testimony whereof I have hereunto set my hand.

HUGH C. LORD.